(12) United States Patent
Kulkarni et al.

(10) Patent No.: US 9,567,504 B2
(45) Date of Patent: Feb. 14, 2017

(54) HYBRID SEALANT COMPOSITION

(75) Inventors: Mona Kulkarni, Andhra Pradesh (IN); Nagesh Chitnavis, Andhra Pradesh (IN); Subodh Deshpande, Andhra Pradesh (IN); Nader Sahawneh, Irving, TX (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 477 days.

(21) Appl. No.: 14/127,128

(22) PCT Filed: Jun. 16, 2012

(86) PCT No.: PCT/US2012/042842
§ 371 (c)(1),
(2), (4) Date: Jun. 23, 2014

(87) PCT Pub. No.: WO2012/174500
PCT Pub. Date: Dec. 20, 2012

(65) Prior Publication Data
US 2014/0329947 A1   Nov. 6, 2014

(51) Int. Cl.
| | | |
|---|---|---|
| B60J 1/00 | (2006.01) | |
| C08F 265/04 | (2006.01) | |
| C08F 265/06 | (2006.01) | |
| C08G 18/62 | (2006.01) | |
| C08G 18/76 | (2006.01) | |
| C09J 175/14 | (2006.01) | |
| C09K 3/10 | (2006.01) | |
| E06B 3/56 | (2006.01) | |
| E06B 3/22 | (2006.01) | |

(52) U.S. Cl.
CPC ............. C09K 3/1021 (2013.01); B60J 1/006 (2013.01); C08F 265/04 (2013.01); C08F 265/06 (2013.01); C08G 18/6225 (2013.01); C08G 18/7671 (2013.01); C09J 175/14 (2013.01); E06B 3/56 (2013.01); E06B 2003/226 (2013.01)

(58) Field of Classification Search
CPC .............. C09K 3/1021; C08G 18/6225; C08G 18/7671; C08F 265/04; C08F 265/06; C08J 175/14; C08J 175/149; B60J 1/006; E06B 2003/226; E06B 3/56
See application file for complete search history.

(56) References Cited

U.S. PATENT DOCUMENTS

| | | |
|---|---|---|
| 4,778,831 A | 10/1988 | Kemper |
| 4,814,215 A * | 3/1989 | Lautenschlaeger ........ C09J 5/00 428/214 |
| 6,346,300 B1 | 2/2002 | Ruepping |
| 7,507,443 B2 | 3/2009 | Trabesinger |
| 2007/0043198 A1 | 2/2007 | Madaj |
| 2009/0098388 A1 | 4/2009 | Harvey et al. |

FOREIGN PATENT DOCUMENTS

| | | |
|---|---|---|
| WO | WO 2008/109145 * | 9/2008 |
| WO | 2009049173 | 4/2009 |

* cited by examiner

Primary Examiner — Patrick Niland
(74) Attorney, Agent, or Firm — Avery N. Goldstein; Blue Filament Law PLLC

(57) ABSTRACT

An acrylic-polyurethane hybrid sealant composition is provided with desirable physical and mechanical properties such as superior adhesion, tensile strength, rheology and bond strength. In particular, the sealant composition of the invention is formulated with isocyanate modified acrylic polymer The composition includes an acrylic pre-polymer, an isocyante functional monomer, a triacrylate as a cross-linker, and a catalyst. A process for preparing the composition is also provided. The hybrid sealant composition is well suited for sealing and bonding requirements in fabrication of articles such as window glazing, back bedding, construction, aerospace and appliances industries. A hybrid sealant composition is provided that develops adequate adhesion and bond strength equivalent to commercially available sealants when used in sealing and bonding applications and is readily formulated to be self-leveling. Articles so fabricated using the hybrid sealant composition are also provided.

14 Claims, No Drawings

HYBRID SEALANT COMPOSITION

RELATED APPLICATIONS

This application claims priority benefit of Indian Provisional Application Serial No. 2068/CHE/2011 filed 17 Jun. 2011; the contents of which are hereby incorporated by reference.

FIELD OF THE INVENTION

The present invention relates to acrylic-polyurethane hybrid sealant composition with desirable physical and mechanical properties such as superior adhesion, tensile strength, rheology and bond strength. In particular, the sealant composition of the invention is formulated with isocyanate modified acrylic polymer that is free of volatile organic compounds thereby rendering the composition an environmentally compatible one.

BACKGROUND OF THE INVENTION

Sealants have been commonly employed for meeting the sealing and bonding requirements in fabrication of windows, doors, recreational vehicle and other manufactured home appliances to reinforce the structural strength of the substrate on which it is applied.

Sealant compositions that are available today are mainly based on mono chemistries like silicone, polyurethane, acrylic, and the like. However, unfortunately, these compositions suffer from a number of disadvantages. For example, many of these sealant compositions are being hygroscopic and may not possess the desired adhesion characteristics, when used in connection with some varied substrates, particularly in high moisture environments. Thus, the commercially available sealants have certain drawbacks such as inadequate shelf life due to hygroscopic nature, limited thermal stability, void formation owing to evolution of carbon dioxide during the curing process, requirement of expensive raw materials, requirement of high temperature, high shrinkage rate and release of acid volatiles which cause cross contamination problems on substrates.

For instance, sealants based on isocyanate-terminated polyurethanes are incompatible for long-term packaging and storage due to their short shelf life, in that i.e., the prepolymers that tend to cure in situ during storage. Also, isocyanate based sealants suffer from the drawback of limited thermal stability. Other commonly employed sealants are based on silicone polymers which are characterized by strong bonding, adhesion and mechanical properties. Silicone sealants generally have desirable properties and yield seals of high quality that perform well under many conditions. Unfortunately, silicone sealants often require expensive raw materials. Also, silicone sealants often do not possess the desired adhesion characteristics when used in connection with certain substrates, particularly in high moisture environments. Further, as many silicone precursors are hygroscopic in nature, silicones tend to form lumps or based on cure clarity, release acidic or basic by product, which corrode or otherwise contaminate the substrate.

Thus, a there is a need for a composition which will materially alleviate the difficulties associated with the traditional sealants and provide superior mechanical and bonding properties with a rapid build of green strength as compared with commercially available sealants. Further, there is a need for a sealant composition that will have adequate shelf life.

Further, there also exists a need for a self-leveling sealant that will flow or "level out" to provide a substantially uniform coating by filling recessions and other minor imperfections in the substrate. Such a self-leveling sealant composition is particularly well suited for application to a substantially horizontal surfaces to seal mechanically fixed joints such that with rapid build of green strength and upon quick curing elastic solid polymeric mass a sealant is created that will meet sealant requirements of window, door, recreational vehicle and other manufactured home appliances.

SUMMARY OF THE INVENTION

A hybrid sealant composition is provided in a specific embodiment including an acrylic pre-polymer, an isocyanate that is a diisocyanate or a polyisocyanate, a tri-functional acrylate as a cross-linker, and a catalyst.

A sealant composition is also provided that includes a polymer system composed of an isocyanates modified acrylic prepolymer in combination with other additives. The hybrid polymer behaves synergistically to confer a unique combination of physical and mechanical properties and is superior to any single polymer system.

In a further aspect, the instant sealant composition has concentrations for individual components as follows:
A majority amount by weight of acrylic pre-polymer, preferably about 30-97 percent by weight,
between about 1 to 10 percent by weight of an isocyanate functional monomer,
between about 0 to 15 percent by weight of a filler,
between about 1 to 10 percent by weight of a cross linker,
between about 0.01 to 0.2 percent by weight of a catalyst,
between about 0 to 15 percent by weight of a plasticizer
between about 0.01 to 0.1 percent by weight of a initiator,
between about 1 to 15 percent by weight of a VOC free solvent.
between about 0.1 to 2 percent by weight of an antioxidant,
between about 0.1 to 1 percent by weight each of adhesion promoter and moisture scavenger and
between about 0.1 to 2 percent by weight of an UV stabilizer A process of preparing the sealant composition is also provided.

The acrylic pre-polymer, the filler, the silica plasticizer and the anti-oxidant dissolved in VOC free solvent are added together to the reaction vessel and blended to form a homogenous mass. The cross-linker inclusive of tri-functional acrylate monomer and an initiator are added in the above mix and is stirred for the required time at a specified temperature. Then desired amount of adhesion promoter and moisture scavenger are added very slowly to the monomer mixture. Reaction mass is then cooled down. After attaining desired temperature, UV stabilizers are dissolved in required quantity of solvent and added to the above mixture and reaction is continued. Lastly, an effective amount of isocyanate functional monomer and catalyst are added. After all the ingredients are added to the reactor, the final charge is cooked under vacuum and packed in nitrogen atmosphere.

Yet another preferred embodiment, an acrylic sealant self leveling composition is provided containing an acrylic prepolymer, an isocyanate functional monomer, a cross linker, a catalyst, a plasticizer, an initiator, a VOC free solvent, an antioxidant, adhesion promoter, moisture scavenger and UV stabilizer. The instant composition may be free of filler or may optionally include a filler.

The hybrid technique based sealant composition is provided that achieves a unique blend of performance properties of synergistic nature, particularly, advantageous for cold application. The hybrid sealant exhibits superior mechanical and bonding properties as compared with the commercially available and commonly used sealants.

The hybrid sealant composition is provided with the following advantages:
- achieves a unique blend of performance properties of synergistic nature, particularly, advantageous for cold application (20° C.);
- high initial green strength that facilitates article handling prior to final cure;
- exhibits superior mechanical and bonding properties as compared with the commercially available and commonly used sealants;
- final product is transparent/translucent, VOC compliant, fast cured, tough, durable and of elastic consistency; and
- exhibits excellent bonding to substrates including aluminum, glass, polyvinyl chloride (PVC), ABS, wood, mild steel (MS), vinyl and fiberglass.

The hybrid sealant composition of the invention is used for sealing and bonding requirements in fabrication of articles in window glazing, back bedding, construction, aerospace and appliances industries. Hence the hybrid sealant composition of the invention develops adequate adhesion and bond strength equivalent to commercially available sealants when used in sealing and bonding applications. The invention also covers articles fabricated using the said hybrid sealant composition.

DETAILED DESCRIPTION OF THE PREFERRED EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification are to be understood as being modified in all instances by the term "about". It is noted that, unless otherwise stated, all percentages given in this specification and appended claims refer to percentages by weight of the total composition.

Thus, before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

It must be noted that, as used in this specification and the appended claims, the singular forms "a," "an" and "the" include plural referents unless the content clearly dictates otherwise. Thus, for example, reference to a "filler" may include two or more such fillers. Unless defined otherwise, all technical and scientific terms used herein have the same meaning as commonly understood by one of ordinary skill in the art to which the invention pertains.

The sealant composition of the present invention is a hybrid sealant composition. The sealant composition encompassed by present the invention incorporate a polymer system composed of an isocyanate modified acrylic polymer in combination with other additives.

The term "sealant", as used herein, defines a polymer material that becomes solid and once applied with sufficient adhesion to the substrate. Sealants offer resistance to environmental conditions to remain bonded over the required life of the assembly. When used between substrates having different thermal co-efficients of expansion or differing elongation under stress, they have adequate flexibility and elongation.

The present invention has utility as a sealant for bonding like or disparate substrates. According to one aspect of the invention, the composition of the present invention includes at least one acrylic prepolymer which reacts to form the base polymer. The invention contemplates the employment of linear or non-linear acrylates. Suitable acrylic pre-polymers may be derived by polymerizations of various acrylic monomers. Standard well known methods are used for the preparation of acrylic prepolymers. Representative of such acrylic prepolymers are those disclosed in US Patent Application Publication US2009/0098388, the contents of which are hereby incorporated by reference. The sealant composition generally includes from about 30 to 97% by weight of an acrylic prepolymer. In exemplary compositions, the acrylic prepolymer component is present from about 53 to 93.5% or in still other embodiments from about 64 to 92% by weight.

According to another aspect of the invention, the sealant composition of the present invention includes at least one isocyanate functional monomer. Isocyanates operative herein are diisocyanates or polyisocyanates in have two or more than two isocyante (—NCO) moieties per molecule. Polyisocyanate include any suitable isocyanate having at least two isocyanate groups illustratively including, aliphatic-, aromatic-, cycloaliphatic-, arylaliphatic-arylalkyl-, alkylaryl-isocyanates, and mixtures thereof. Suitable diisocyanate functional monomers operative herein illustratively include 2,4-toluene diisocyanate (TDI), 2,6-toluene diisocyanate, 4,4' diphenylmethylene diisocyanate (MDI), isophorone diisocyanate, dicyclohexyl-methane diisocyanate, various liquid diphenylmethylene diisocyanates containing 2,4- and 4,4' isomers, etc. and mixtures thereof. The isocyanate monomer is typically present in the composition in an amount from about 1 to 10% by weight, in other embodiments from about 2 to 8% by weight and even more preferably from about 2 to 6% by weight. In specific embodiments of the present invention the total weight percentage of isocyanate groups (—NCO) in the composition is below 1.5 total weight percent, while in other embodiments, the amount of —NCO is between 0.2 and 1.0 total weight percent.

According to another embodiment of the invention, the sealant composition of the present invention contains at least one filler. Fillers employed in the present invention include hydrophobic fillers which are employed as reinforcing agents or rheology modifier. The chemical composition of the filler, and its particle size and morphology, particle size distribution of the filler are rationally selected to confer desirable physical properties to the composition. According to a specific embodiment of the invention, the hybrid sealant is rationally designed with minimum quantity of filler without any compromise on the mechanical properties of the product, which is one of the advantageous features in significantly reducing the cost of manufacture. Examples of fillers that are operative herein illustratively include fumed silica, colloidal silica, calcite, limestone, mica, talc, asbestos fibers or powder, diatomaceous earth, carbon black, metal particulate, barium sulfate, alumina, slate flour, calcium silicate, magnesium carbonate, magnesium silicate, and the like. The chemical composition of the filler, and its particle size and morphology, particle size distribution of the filler are rationally selected to confer desirable physical properties to the composition. It is appreciated that carbon black or metallic fillers render an inventive composition electrically conductive at loadings at or near a percolation threshold. Additionally, substrates prone to corrosion are protected by including a sacrificial anodic metal filler relative to a substrate material. Zinc filler is exemplary of sacrificial anodic filler.

A filler is present in the composition in an amount of about 0 to 15% by weight, in other embodiments from about 1 to 8% by weight and in still other embodiments from about 1 to 6% by weight. However, it is appreciated that the amounts of filler used can be varied within wide limits in accordance with the intended use of the composition. In some sealant applications the sealant composition of the present invention is free of filler.

According to another aspect of the invention, the sealant composition of the present invention includes at least one cross linker that is a trifunctional monomer illustratively including trimethylol propane triacrylate, trimethylol propane trimethacrylate and tris(2-hydroxyethyl)isocyanurate triacrylate and the like. The cross linker is present in the composition in an amount of from about 1 to 10% by weight, in other embodiments that is an amount of from about 1 to 8% by weight and in still other embodiments in an amount of about 3 to 6% by weight.

The sealant composition of the present invention also includes a catalyst to accelerate the reaction between the acrylic prepolymer and polyisocyanate, hydrolysis, and/or subsequent crosslinking reactions or a combination thereof. The catalyst preferably is stable and does not contribute to unwanted side reactions, particularly during manufacture, transportation or storage of the sealant material. Suitable catalysts illustratively include organic metallics, stannous salts of carboxylic acids, tin organo-metallics, and the like. In accordance with the present invention, the preferred catalyst is a tin catalyst, for e.g., dibutyltin dilaurate. The catalyst is typically present in an amount of from about 0.01 to 0.2% by weight, in other embodiments in an amount of from about 0.02 to 0.1% by weight and in still other embodiments in an amount of about 0.03 to 0.07%.

The sealant composition of the present invention optionally includes at least one plasticizer that functions as an extender or improves plasticity of the composition. The plasticizer used in this invention illustratively includes tris (2-ethylhexyl)trimellitate (TOTM), trimethyl pentanyl diisobutyrate (TXIB), phthalate free $C_1$-$C_{20}$ alkylsulphonic acid ester with phenol, benzoate ester and combinations thereof. The plasticizer present in the composition in a total amount from about 0 to 15% by weight, in other embodiments in an amount of from about 0 to 8% weight and in other embodiments in an amount of about 0.01 to 6% by weight.

The polymerization process is initiated by the addition of a free radical generating initiator. Free radical polymer initiators are well known to those of skill in the art and are selected based on the speed, temperature, catalytic target and the like. Initiators operative herein illustratively include tert-butyl hydroperoxide (TBHP), tert-butyl peroxybenzoate (TBPB), and cumene hydroperoxide (CHP). The initiator is present in an amount sufficient to provide the desired rate of polymerization. Typically, the initiator is added in an amount of from about 0.01 to 0.1% by weight, in other embodiments in an amount of from about 0.01 to 0.05% by weight and in other embodiments in an amount of about 0.01 to 0.03% by weight.

The sealant composition of the present invention optionally includes sufficient solvent to have a desirable viscosity at room temperature and to be applied to a substrate under ambient conditions. Preferably, the solvent employed in accordance with the present invention is free from VOCs (volatile organic compounds). It is appreciated that other non-VOC solvents are also operative herein and are optionally present at levels of reduced regulatory concerns. VOC exempt solvents operative herein illustratively include dimethylcarbonate, propylene carbonate and tert butyl acetate. The solvent is present in an amount of from about 1 to 15% by weight, in other embodiments if present is in an amount of from about 2 to 12% by weight and in other embodiments in an amount of about 1.5 to 10% by weight.

An antioxidant is optionally present in an inventive composition. An antioxidant operative herein illustratively includes ditridecyl thiodipropionate (DTDTDP), dilauryl thiodipropionate (DLTDP), distearyl thiodipropionate (DSTDP) and 3,5-Bis(1,1-dimethylethyl)-4-hydroxybenzenepropanoic acid octadecyl ester and Tris(2,4-di-tert-butylphenyl)phosphite (168) and combinations thereof. Typically, an antioxidant is added in an amount of from about 0 to 2% by weight, in specific embodiments in an amount of from about 0.2 to 1% and in other embodiments in an amount of about 0.2 to 0.6% by weight.

The sealant composition of the present invention also optionally includes one of, or both, an adhesion promoter and a moisture scavenger. Useful adhesion promoters operative herein illustratively include 3-aminopropyl triethoxy silane (AMEO), 3-aminopropyl trimethoxy silane, 3-glycidoxypropyltrimethoxysilane, N-(beta-aminoethyl)gamma aminopropyltrimethoxysilane and combinations thereof. It is appreciated that an amino silicone in combination with a monomeric diisocyanate in the composition readily form an adhesion promoting complex. TDI is exemplary of such diisocyanates. It is appreciated that in addition to the above-mentioned exemplary monomeric adhesion promoters, polymer adhesion promoters are operative herein and illustratively include maleic anhydride modified polymers of polypropylene (PP) styrene; maleic anhydride copolymers of PP, styrene and methyl vinyl ether; polyorganosiloxanes; polyorganosilanes; and combinations thereof.

The moisture scavenger operative herein illustratively includes methyldiphenylethoxysilane; vinyl trimethoxy silane (VTMO), vinyl triethoxy silane; acid anhydride esters such as diethyl malonate and dimethyl succinate; and combinations thereof.

Both the adhesion promoter and moisture scavenger, if present, are typically in an amount of from about 0 to 1% by weight for each as individual or combinations of compounds, in other embodiments from about 0.2 to 1% by weight and, if present, in other embodiments in an amount of about 0.2 to 0.8% by weight.

The sealant composition of the present invention optionally includes UV stabilizers. Examples of UV stabilizers are benzotriazoles, benzophenones, triazines, hindered amine light stabilizers, 2-(benzotriazol-2-yl)-4-(2,4,4-trimethylpentan-2-yl)phenol, 3,5-di-t-butyl-4-hydroxybenzoic acid, hexadecyl ester and combinations thereof. The UV stabilizers, if present, is typically in an amount of from about 0.1 to 2% by weight, in other embodiments from about 0.3 to 1.2% by weight and in still other embodiments in an amount of about 0.4 to 1% by weight.

The inventive compositions optionally include other additives conventional to the sealant art including but not limited to non reactive resins, dehydrators, colorants (e.g., pigments and dyes), flame retardants, waxes, and mixtures thereof.

In a preferred specific embodiment, the instant sealant composition includes individual components as follows:
the acrylic prepolymer is present in an amount of 53-93.5 percent by weight;
the isocyanate functional monomer is present in an amount of 2 to 8 percent by weight;
the filler is present in an amount of 1 to 8 percent by weight;
the cross linker is present in an amount of 1-8 percent by weight;
the catalyst is present in an amount of 0.02 to 0.1 percent by weight;
the plasticizer is present in an amount of 0 to 8 percent by weight;
the initiator is present in an amount of 0.01 to 0.05 percent by weight;
the VOC free solvent is present in an amount of 2 to 12 percent by weight;
the antioxidant is present in an amount of 0.2 to 1.0 percent by weight;
the adhesion promoter and the moisture scavenger each is present in an amount of 0.2 to 1 percent by weight; and
the UV stabilizer is present in an amount of 0.3 to 1.2 percent by weight.

In accordance to a preferred embodiment of the present invention, the formulation is a transparent sealant. Transparent sealants generally do not contain colorants which would make the sealant translucent and even opaque. However, it is appreciated that such colorants are functional in opaque embodiments of an inventive composition.

In a further preferred embodiment, well suited as a substrate dressing composition has:
acrylic pre-polymer, that is present in an amount of 64-92 percent by weight;
isocyanate functional monomer is present in an amount of 2 to 6 percent by weight;
the filler that is present in an amount of 1 to 6 percent by weight;
the cross linker that is present in an amount of 3 to 6 percent by weight;
the catalyst that is present in an amount of 0.03 to 0.07 percent by weight;
the plasticizer that is present in an amount of 0.01 to 6 percent by weight;
the initiator that is present in an amount of 0.01 to 0.03 percent by weight;
a VOC exempt solvent that is present in an amount of 1.5 to 10 percent by weight;
the antioxidant that is present in an amount of 0.2 to 0.6 percent by weight;
the adhesion promoter and the moisture scavenger that are present each in an amount of 0.2 to 0.8 percent by weight; and
the UV stabilizer that is present in an amount of 0.4 to 1% percent by weight.

Another aspect of the present invention relates to a process of preparing the hybrid sealant composition which includes
a. adding acrylic pre-polymer, optionally filler, plasticizer and anti-oxidant dissolved in solvent together to the reaction vessel
b. blending these components together to form a homogenous mass
c. adding cross-linker and initiator to the above mixture and stirring
d. adding the adhesion promoter and moisture scavenger slowly to the above mixture
e. cooling down the reaction mass to the desired temperature
f. dissolving the UV stabilizers in the required quantity of solvent and adding to the above mixture
g. adding the isocyanate functional monomer and catalyst drop wise to this mixture with vigorous stirring
h. cooking the final charge under vacuum and
i. packing in nitrogen atmosphere.

According to a further aspect of the invention, an exemplary composition as per the current invention is subjected to various tests to evaluate the performance and improvements of the present hybrid sealant composition. Accordingly, to evaluate the mechanical properties, tensile strength test, water resistance test and lap shear strength test are conducted and to evaluate the physical properties, hardness shelf life, skin time, cure time, percentage solid, filler percentage etc are tested.

The following examples illustrate certain embodiments and aspects of the present invention and not to be construed as limiting the scope thereof. All parts and percents therein are by weight unless otherwise indicated.

EXAMPLES

The following examples are set forth to further exemplify the invention and are not intended to be limiting thereof.

Example 1

A preferred sealant composition according to the instant invention is prepared having the following composition shown in Table 1.

TABLE 1

Formulation for specific sealant composition according to the present invention.

| Sl. NO | INGREDIENT | WEIGHT % |
|---|---|---|
| 1 | Acrylic pre-polymer per U.S. patent application publication US2009/0098388 | 63.7-82.45 |
| 2 | Methylene diphenyl diisocyanate | 2-6% |
| 3 | Hydrophobic silica | 1-6% |
| 4 | Trimethylol propane triacrylate | 3-6% |
| 5 | Dibutyltin dilaurate | 0.03-0.07% |
| 6 | Phthalate free alkyl sufonic acid ester of phenol | 0.01-6% |
| 7 | Tert Butyl Hydroperoxide | 0.01-0.03 |
| 8 | Tert Butyl Acetate | 1.5-10% |
| 9 | 3,5-Bis(1,1-dimethylethyl)-4-hydroxybenzenepropanoic acid octadecyl ester2-(benzyltriazol-2-yl)-4-(2,4,4 trimethyl) | 0.2-0.6% |
| 10 | AMEO | 0.2-0.8% |
| 11 | VTMO | 0.2-0.8% |
| 12 | UV stabilizers | 0.4-1% |

The composition in accordance with the present invention is prepared in the following manner. The acrylic pre-polymer, hydrophobic silica, plasticizer and anti-oxidant are dissolved in VOC free solvent are added together to the reaction kettle equipped with mechanical stirrer and nitrogen gas blanketing. The pre-polymers, filler and plasticizer are blended by swirling the mixture for approximately 15 minutes at 64±10.0° C. until a homogenous mass is formed. Trimethylol propane triacrylate and initiator are added in the above mix and is stirred for 60 minutes at 64±10.0° C. After 60 minutes, desired amount of adhesion promoter and moisture scavenger are added very slowly to the monomer mixture. Reaction mass is cooled down to 58° C. After attaining desired temperature, UV stabilizers are dissolved in required quantity of solvent and added to the above mixture and reaction is continued for another 10 minutes. Lastly, effective amount of isocyanate functional monomer and tin catalyst are added dropwise over the period of 10-15 minutes with vigorous stirring. After all the ingredients are added to the reactor, cooked the final charge for 20 minutes under vacuum 600 mmHg and packed in nitrogen atmosphere.

Example 2

The sealant composition of Example 1 is reproduced with the inclusion of 2.3 total weight percent of maleic anhydride styrene resin and 0.9% total weight percent of diethylmalonate with a commensurate decrease in the silica content after 75 minutes and otherwise processed per Example 1.

Example 3

Comparative Evaluation of the Instant Composition with Commercial Sealants

The sealant compositions of the present invention (Examples 1 and 2) are comparatively evaluated with other commercially available sealants (Sealant 1 to 3 in the Table) and are analyzed for various mechanical properties such as tensile strength, percentage elongation and physical properties such as hardness, water resistance, shelf life, skin time, cure time, percentage solid, filler percentage. The evaluation results are tabulated in Table 2.

To assess the thermal stability of the sealant compositions, the samples prepared in accordance to the present invention per Examples 1 and 2 are kept at 50° C. for 21 days and no changes in the viscosity are observed during the test period.

To assess the water resistance ability of the sealant compositions, the samples prepared in accordance to the present invention per Examples 1 and 2 are soaked in distilled water for 7 days and no swelling or blushing/skinning is observed.

The hardness of the sealant compositions are measured using a Durometer, type A-according to ASTM C661.

The skin time refers to the amount of time which passes before a solid film is produced and is determined according to ASTM C-679. According to a preferred aspect of the present invention, the sealant composition provides a fast skin time of about 10-15 minutes, which is sufficiently fast to be convenient for the user. The sealants of the present invention have a skin time of less than about 20 minutes and greater than about 10 minutes, preferably about 10-15 minutes.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description.

We claim:
1. A hybrid sealant composition comprising:
an acrylic pre-polymer;
an isocyanate that is a diisocyanate or a polyisocyanate;

TABLE 2

Properties of comparative and inventive compositions.

| Test | Method | Sealant 1 | Sealant 2 | Sealant 3 | Sealant composition of the present invention. - Ex. 1 | Sealant composition of the present invention. - Ex. 2 |
|---|---|---|---|---|---|---|
| Appearance | — | Transparent | Red | Transparent | Transparent | Transparent |
| Skin Over Time, Min | ASTM C-679 | 10-15 | 10-15 | 15 | 10~15 | 10~15 |
| Solid Content, % | — | 96% | 95-96% | 96% | 97% | 97% |
| Filler Content % | — | 23% | 25% | 15% | 5.41% | 2.21 |
| Hardness, Shore A | ASTM C-661 | 35-40 | 35-40 | 35-40 | 30-35 | 30-35 |
| Tensile Strength, psi | ASTM D-412 | 100 | 90 | 90 | 130 | 277 |
| Elongation at Break, % | ASTM D-412 | 300 | 250 | 300 | 300 | 583 |
| Water resistance | — | Passes | Passes | Passes | Passes | Passes |
| Lap Shear Strength (psi) | ASTM D1002 | 250 (SF)* | 210 (SF)* | 220 (SF)* | 270 | 290+ |

*(SF): substrate failure

It has been found that the sealant composition of the instant invention has very high thermal stability with excellent self-leveling properties, have fast skin time and can be cold applied. Further, the instant sealant demonstrates excellent adhesion to aluminium and glass with good flexibility relative to silicone sealants. Being self-leveled, inventive composition cured to a product with sufficient initial flow properties to provide a smooth surface, without forming concentrated voids towards the top of the cured product.

The cohesive strength of the sealant composition when subjected to shear stress is measured Lap-shear test method (ASTM D1002). Lap shear test measures the strength of sealant bond under conditions of constant shear and provides information regarding the adhesive bond to the substrates being tested.

a tri-functional acrylate as a cross-linker; and
a catalyst; and
wherein the acrylic pre-polymer is present in an amount of 30 to 97 percent by weight, the isocyanate is present in an amount of 1 to 10 percent by weight, the cross linker is present in an amount of 1 to 10 percent by weight, and the catalyst is present in an amount of 0.01 to 0.2 percent by weight.
2. The hybrid sealant composition comprising:
an acrylic pre-polymer;
an isocyanate that is a diisocyanate or a polyisocyanate;
a tri-functional acrylate as a cross-linker;
a catalyst;
a plasticizer present in an amount of 0 to 15 percent by weight; an initiator present in an amount of 0.01 to 0.1 percent by weight; a solvent present in an amount of 1 to 15 percent by weight; an antioxidant present in an amount of 0.1 to 2 percent by weight; an adhesion promoter and a moisture scavenger each present in an amount of 0.1 to 1 percent by weight; and an ultraviolet (UV) stabilizer present in an amount of 0.1 to 2 percent by weight.

3. The hybrid sealant composition as claimed in claim 2, wherein the acrylic prepolymer is present in an amount of 53 to 93 percent by weight, the isocyanate functional monomer is present in an amount of 2 to 8 percent by weight, the cross linker is present in an amount of 1-8 percent by weight, the catalyst is present in an amount of 0.02 to 0.1 percent by weight, the plasticizer is present in an amount of 0 to 8 percent by weight, the initiator is present in an amount of 0.01 to 0.05 percent by weight, the solvent is VOC exempt and present in an amount of 2 to 12 percent by weight, the antioxidant is present in an amount of 0.2 to 1.0 percent by weight, the adhesion promoter and the moisture scavenger each is present in an amount of 0.2 to 1 percent by weight and the UV stabilizer is present in an amount of 0.3 to 1.2 percent by weight.

4. The hybrid sealant composition as claimed in claim 2, wherein the acrylic prepolymer is present in an amount of 64 to 92 percent by weight, isocyanate functional monomer is present in an amount of 2 to 6 percent by weight, the cross linker is present in an amount of 3 to 6 percent by weight, the catalyst is present in an amount of 0.03 to 0.07 percent by weight, the plasticizer is present in an amount of 0 to 6 percent by weight, the initiator is present in an amount of 0.01 to 0.03 percent by weight, the solvent is VOC free and present in an amount of 1.5 to 10 percent by weight, the antioxidant is present in an amount of 0.2 to 0.6 percent by weight, the adhesion promoter and the moisture scavenger each is present in an amount of 0.2 to 0.8 percent by weight and the UV stabilizer is present in an amount of 0.4 to 1% percent by weight.

5. The hybrid sealant composition as claimed in claim 1, wherein the isocyanate is one of an aliphatic, an aromatic, a cycloaliphatic, an arylaliphatic, an arylalkyl, or mixtures thereof.

6. The hybrid sealant composition as claimed in claim 1, wherein the isocyanate is one of 2,4-toluene diisocyanate, 2,6-toluene diisocyanate, 4,4'-diphenyl-methylenediisocyanate, isophorone diisocyanate, dicyclohexylmethane diisocyanate, liquid diphenyl methane diisocyanates containing 2,4- and 4,4'-isomers or mixtures thereof.

7. The hybrid sealant composition as claimed in claim 1, wherein the cross linker is one of trimethylol propane triacrylate, trimethylol propane trimethacrylate or tris (2-hydroxy ethyl) isocyanurate triacrylate.

8. The hybrid sealant composition as claimed in claim 2, wherein the plasticizer is one of tris (2-ethylhexyl) trimellitate, trimethyl pentanyl diisobutyrate, phthalate free alkylsulphonic acid ester with phenol, benzoate ester plasticizer, or mixtures thereof.

9. The hybrid sealant composition as claimed in claim 2, wherein the initiator is one of tert butyl hydroperoxide (TBHP), tert butyl peroxybenzoate (TBPB), cumene hydroperoxide (CHP), or mixtures thereof.

10. The hybrid sealant composition as claimed in claim 2, wherein the solvent is one of dimethylcarbonate, propylene carbonate, tert butyl acetate, or a mixture thereof.

11. The hybrid sealant composition as claimed in claim 2, wherein the antioxidant is one of ditridecyl thiodipropionate, di lauryl thiodipropionate, distearyl thiodipropionate, 3,5-Bis (1,1-dimethylethyl)-4-hydroxybenzenepropanoic acid octadecyl ester, tris (2,4-di-tert-butylphenyl) phosphite, or a mixture thereof.

12. The hybrid sealant composition as claimed in claim 2, wherein the adhesion promoter is one of 3-aminopropyl triethoxy silane, 3-aminopropyl trimethoxy silane, glycidoxypropyltrimethoxysilane N-(beta-aminoethyl) gamma-aminopropyltrimethoxysilane, or a mixture thereof.

13. A process of preparing the hybrid sealant composition comprising:
   adding together acrylic pre-polymer, optionally filler, plasticizer and anti-oxidant dissolved in solvent in a reaction vessel;
   blending to form a homogenous mass;
   adding a cross-linker, an initiator, an adhesion promoter and a moisture scavenger to the homogenous mass;
   cooling down the mass;
   adding UV stabilizers to the homogenous mass;
   continuing reaction with addition of isocyanate functional monomer and catalyst with vigorous stirring to form a final charge;
   cooking the final charge under vacuum; and
   packing the final charge after the cooking in a nitrogen atmosphere.

14. The process as claimed in claim 13 wherein the acrylic pre-polymer, the optional filler and the plasticizer are added together to the reaction vessel, blended by swirling the mixture for approximately 15 minutes at 64° C.±10.0° C., the cross linker and the initiator are added to the mass and stirred for 60 minutes at 64° C.±10.0° C., after 60 minutes, the adhesion promoter and the moisture scavenger are added, the mass then cooled down to 55~60° C., the UV stabilizers are dissolved in required quantity of the solvent that is VOC exempt and added to the mass and the reaction continued for another 10 minutes, the final charge cooked for 20 minutes under vacuum at 600 mmHg and packed in the nitrogen atmosphere.

* * * * *